Oct. 15, 1968  T. E. MEALIN ETAL  3,405,701

ROTARY VALVE FOR ENGINES

Filed Sept. 6, 1966  2 Sheets-Sheet 1

INVENTORS
THOMAS EDWARD MEALIN
DOUGLAS GREAVES
By Shoemaker and Mattare
Attys.

3,405,701
ROTARY VALVE FOR ENGINES
Thomas E. Mealin and Douglas Greaves, both of 25 Kerk
St., Standerton, Transvaal, Republic of South Africa
Filed Sept. 6, 1966, Ser. No. 577,248
Claims priority, application Republic of South Africa,
Sept. 14, 1965, 4,979/65
3 Claims. (Cl. 123—190)

ABSTRACT OF THE DISCLOSURE

A sleeve enclosed hollow, cylindrical, rotary spool valve has an axial bore for the circulation of a liquid cooling medium. It further has a pair of spaced apart annular recesses in the outer surface thereof. Between the recesses are a pair of pockets, one communicating with each recess by an undercut passage. The sleeve has openings into the recess and other openings into the combustion chamber of the engine which latter openings are in line radially with the pockets respectively. The pockets are in the surface of the cylinder and each extend only part way around the periphery thereof.

---

Figure 1:
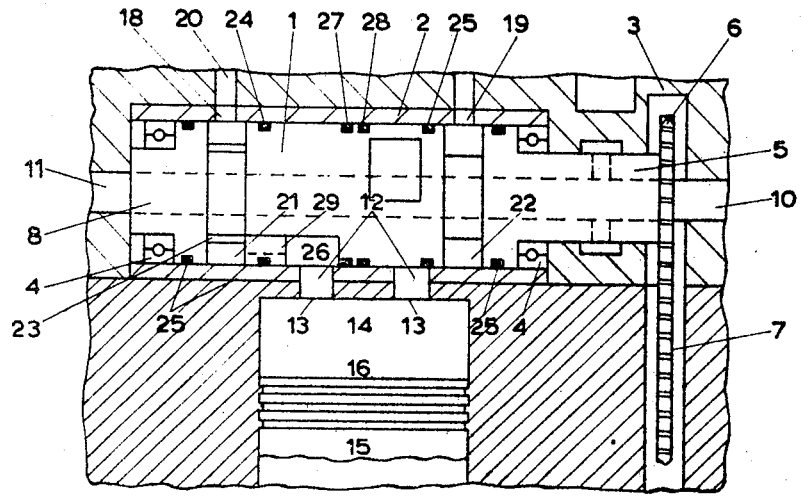

This invention relates to rotary valves for engines and more particularly four stroke internal combustion engines though it will be appreciated that the invention is not confined to the latter application and may be used in gas, steam air or hydraulic engines.

It is the object of this invention to provide an improved rotary valve for controlling the inlet of the power producing material hereinafter termed fuel to the cylinder of the engine and for regulating the exhaust therefrom as may be necessary. Rotary and semi-rotary valves are known and have been used in various engines, and although possessing many advantages have some drawbacks. These draw-backs have been concerned, mainly with cooling, sealing and lubrication problems which have been substantially overcome in the valve arrangement according to this invention.

According to this invention there is provided a rotary valve adapted to rotate in a parted cylindrical housing, said valve comprising a rigid hollow cylinder having a pair of annular recesses in the outer wall of the cylinder and spaced apart along the length thereof, peripheral sealing ring grooves on each side of each recess, pockets in the outer cylinder wall one communicating with each recess, said pockets located between the recesses and angularly off-set from each other around the periphery of the cylinder, a sealing ring groove between the pockets and means for connecting the cylinder to a rotary drive therefor.

Further features of this invention provide for a pumping vane to be positioned axially in the hollow cylinder and for the one annular recess to have a roughened or vaned surface.

The invention also provides an assembly of the valve in an engine wherein the cylinder is housed in a complementary sleeve having a pair of ports opening into the cylinder of the engine and a further pair of ports one opening to a fuel supply and the other to the engine exhaust so that with the valve in particular positions there will be communication between the fuel supply and engine cylinder through one recess and pocket combination or communication between engine cylinder and exhaust through the other recess and pocket combination of the valve.

Seal pads of lubricant absorbent wear resistant material will preferably be arranged on each side of each port in the housing along the path of rotation of the valve in the housing.

A preferred form of this invention will be described as applied to a single cylinder four stroke cycle spark ignition engine and with reference to the accompanying mainly diagrammatic drawings. It will be appreciated that the particular layout is not limitative to the scope of the invention as the arrangement of ports, bearings seals and the like can be modified to suit any particular requirements.

Figure 2:
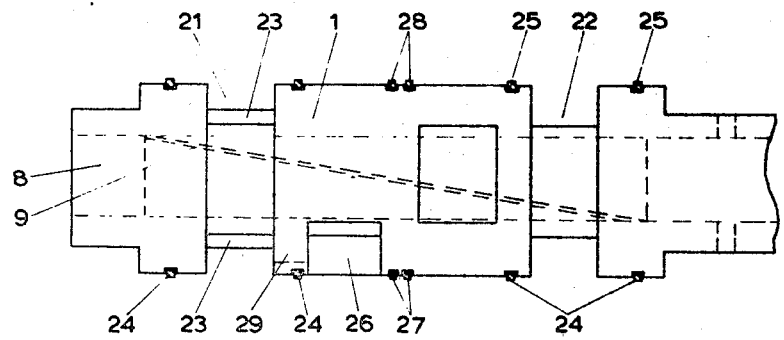
Figure 5:
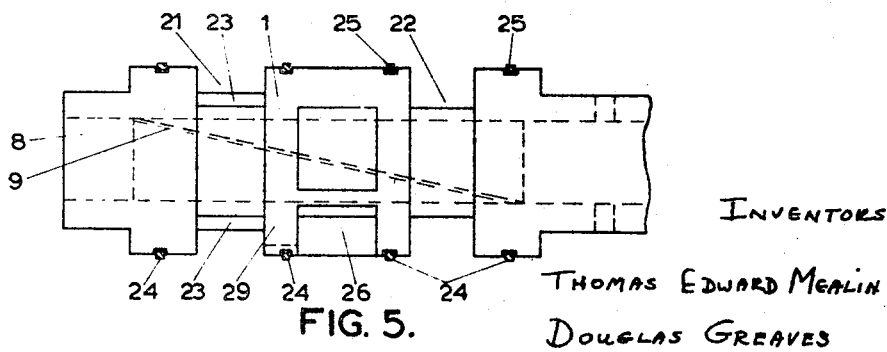
Figure 3:
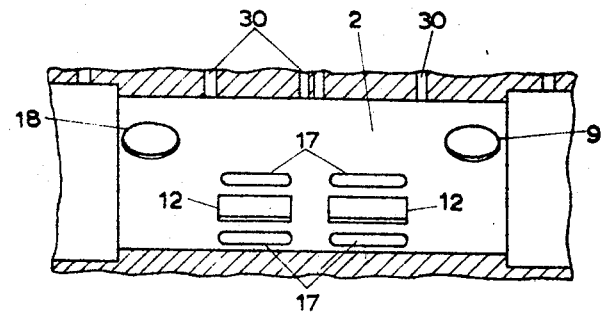
Figure 4:
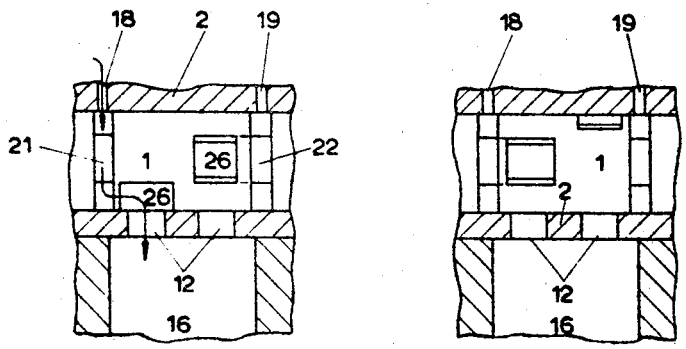
Figure 4:
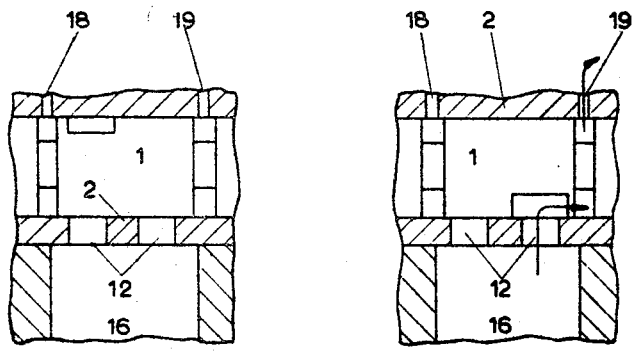

In the drawings:

FIG. 1 is a part sectional view of the valve in position,
FIG. 2 a plan of the valve,
FIG. 3 a section through the sleeve for the valve,
FIG. 4 diagrams illustrating the normal cycle of operation of the engine, and
FIG. 5 a plan view of an alternative valve.

The valve 1 has in the drawings been fitted in a hollow sleeve 2 removably secured in an engine cylinder head 3. The valve is supported to rotate in the sleeve in anti-friction bearings 4 on each side of the valve. One end 5 of the valve has been extended to carry a suitable sprocket 6 for a chain drive 7 from the engine crankshaft (not shown) so that the valve 1 will be made to rotate at half the speed of rotation of the crankshaft.

The valve 1 consists of a hollow rigid cylindrical member having a bore 8 therethrough. In this bore is an axially extending pumping vane 9 and the bore 8 is connected with suitable seams to passages 10, 11 which form part of the engine cooling system. Thus the pumping of coolant which may be either water or air is obtained in a very simple manner which has proved to be effective and efficient in practice.

The hollow sleeve 2 has ports formed therein and a pair 12 of these ports are laterally adjacent and open through apertures 13 into the combustion chamber 14 above piston 15 in engine cylinder 16 and sealing pads 17 are provided on each side of ports 12 in the path of rotation of the valve 1 and suitably spring loaded (not illustrated) to bear against the valve 1 to prevent the passage of gas peripherally around valve 1. These pads 17 are to be made of suitable lubricant adsorbent material such as sintered metal and other forms of metal pad known to have the adsorbent property.

A controlled lubricant supply (not shown) will preferably be provided to ensure that the pads retain sufficient oil or other lubricant to run smoothly on the outer surface of the valve.

Sleeve 2 has two other ports 18, 19 spaced apart from each other and one 18 of these is connected to the fuel supply through suitably arranged passageways indicated at 20. Port 19 is connected to the exhaust outlet for the engine.

The valve 1 is arranged to control the flow of fuel and exhaust to and from the engine cylinder 16.

A pair of annular recesses 21, 22 are provided in the outer wall of the cylindrical valve 1 and spaced apart. These recesses are in direct communication with the respective inlet and outlet ports 18, 19 in the sleeve 2. The walls of the recesses 21 communicating with the inlet port 18 has vanes 23 formed therein or are otherwise roughened to ensure an enhanced turbulence of a fuel mixture passing into engine cylinder 16 and thus more efficient operation than would otherwise be obtained. It may also be possible where circumstances so permit to obtain a blower effect from these vanes and supercharging of the engine in a very simple and efficient manner.

The walls of the outlet recess 22 are made smooth.

Sealing rings 24 fitting in grooves 25 are provided on each side of each recess 21, 22.

A pocket 26 is formed in the outer wall of the cylindrical valve 1 to communicate one with each recess 21, 22 and these pockets 26 each extend over substantially one quarter of the periphery of the valve. Further the two pockets 26 are off-set from each other by substantially 90° of angular displacement. The exact relationship of these components will be a feature of design for the particular engine to which the valve in accordance with this invention is applied.

A further pair of sealing rings 27 are fitted in grooves 28 to separate the pockets 26 from any communication with each other.

It will be seen that an undercut portion 29 is provided below the sealing rings 24 on the outer sides of pockets 26 so that each pocket is open to the adjacent recess 21 or 22.

Lubricant can be supplied from a usual form of engine oil pump through passages 30 provided in the cylinder head 3 and sleeve 2 to the sealing rings 24 and 27 and bearings 4 for the valve 1.

In use the engine operates on the four stroke cycle as can be seen in FIG. 4.

The first position shows the suction stroke half completed with cylinder 16 connected to the fuel supply through one of ports 12, pocket 26, recess 21 and port 18.

The next two positions show the compression and power strokes half completed when the cylinder is sealed from either of pockets 26 and recesses 21, 22.

The final position is half-way through the exhaust stroke where the exhaust may flow through port 12, pocket 26, recess 22 and port 19 to atmosphere.

It will be appreciated that the valve above described gives efficient cooling and sealing together with adequate lubrication. The arrangement is also such that sharp opening and cut-off can be obtained and also enables high compression ratios to be achieved since there is no valve opening into the cylinder 16.

It will further be understood that where the valve arrangement is to be used for multi-cylinder engine single inlet or exhaust recesses may be used for adjacent cylinders in the well known way.

The valve is smooth running and may easily be removed and replaced with or without its associated sleeve in the cylinder head as and when required.

In FIG. 5 the valve is shown in which the pockets communicating with their associated annular recesses and it will be seen that in this arrangement the pockets are off-set peripherally only and not both peripherally and longitudinally as shown in FIGS. 1 to 4. The arrangement of FIG. 5 gives a more compact design which has only a slight practical limitation over the alternative illustrated form with regard to valve timing considerations.

What we claim as new and desire to secure by Letters Patent is:

1. A rotary valve assembly for an engine comprising a spool valve in the form of a rigid cylinder having an axial bore throughout the length thereof providing a liquid cooling passage therethrough, said cylinder having a pair of annular recesses in the outer wall of the cylinder and spaced apart along the length thereof, peripheral sealing ring grooves on each side of each recess, pockets in the outer cylinder wall one communicating with each recess, each having a peripheral width less than half the periphery of the cylinder, said pockets located between the recesses and angularly off-set from each other around the periphery of the cylinder, the outer side of each pocket being connected to an undercut portion which provides a passage to the adjacent recess, the peripheral width of said passageway being no greater than the peripheral width of the pocket connected therewith, and means for connecting the cylinder to a rotary drive therefor, a sleeve housing said cylinder and complementary thereto, one port in said sleeve opening into the combustion chamber of the engine and also positioned to open into one of said pockets and a further pair of ports, one opening respectively into one of said pair of recesses and one of said pair of ports positioned to open into a fuel supply and the other to the engine exhaust, another port in said sleeve opening into the combustion chamber and also positioned to open into the other of said pockets, so that communication may be made through one valve annular recess and associated pocket from the fuel supply to the cylinder and from the cylinder to exhaust through the other valve annular recess and associated pocket.

2. A rotary valve as claimed in claim 1 including a pumping vane positioned longitudinally in the axial bore.

3. A rotary valve assembly as claimed in claim 1 in which lubricant adsorbent wear resistant material pads are held in the sleeve on either side of each port positioned to open into the combustion chamber and along the path of rotation of the valve in the sleeve.

References Cited

UNITED STATES PATENTS

| | | |
|---|---|---|
| 1,098,574 | 6/1914 | Hopkes. |
| 1,102,183 | 6/1914 | Augustin et al. |
| 1,130,045 | 3/1915 | Walker. |
| 1,276,242 | 8/1918 | Massey. |
| 1,672,564 | 6/1928 | Frazier. |
| 1,177,407 | 3/1916 | Gilson. |

FOREIGN PATENTS

| | | |
|---|---|---|
| 695,285 | 9/1930 | France. |
| 591,483 | 8/1947 | Great Britain. |

WENDELL E. BURNS, *Primary Examiner.*